United States Patent
Bando et al.

(10) Patent No.: US 7,331,709 B2
(45) Date of Patent: Feb. 19, 2008

(54) TEMPERATURE MEASURING METHOD USING MICRO TEMPERATURE SENSING ELEMENT

(75) Inventors: Yoshio Bando, Ibaraki (JP); Yihua Gao, Ibaraki (JP); Zongwen Liu, Ibaraki (JP); Dmitri Golberg, Ibaraki (JP)

(73) Assignee: National Institute of Materials Science, Ibaraki (JP)

( * ) Notice: Subject to any disclaimer, the term of this patent is extended or adjusted under 35 U.S.C. 154(b) by 79 days.

(21) Appl. No.: 10/521,767

(22) PCT Filed: Jun. 30, 2004

(86) PCT No.: PCT/JP2004/009615

§ 371 (c)(1),
(2), (4) Date: May 24, 2005

(87) PCT Pub. No.: WO2005/001403

PCT Pub. Date: Jan. 6, 2005

(65) Prior Publication Data

US 2005/0238082 A1    Oct. 27, 2005

(30) Foreign Application Priority Data

Jun. 30, 2003   (JP)  ............................. 2003-186607

(51) Int. Cl.
*G01K 5/00*   (2006.01)
(52) U.S. Cl. ...................... 374/201; 374/106; 977/955; 977/744
(58) Field of Classification Search ................ 374/100, 374/104, 201; 977/955, 744
See application file for complete search history.

(56) References Cited

U.S. PATENT DOCUMENTS

| | | | | |
|---|---|---|---|---|
| 1,793,303 A | * | 2/1931 | Boyer | ......................... 374/190 |
| 3,688,582 A | * | 9/1972 | Gradishar et al. | ........... 374/105 |
| 2001/0051367 A1 | * | 12/2001 | Kiang | ......................... 435/182 |

FOREIGN PATENT DOCUMENTS

| | | | |
|---|---|---|---|
| JP | 6-227806 | | 8/1994 |
| JP | 2003-227762 | | 8/2003 |
| JP | 2005022880 A | * | 1/2005 |

OTHER PUBLICATIONS

"Capillarity-induced filling of carbon nanotubes" P.M. Aiayan et al, Nature (London), vol. 361, p. 333-334, Jan. 28, 1993 (Dupplicate, properly cited in other IDS).

Y. Gao et al., "Temperature measurement using a gallium-filled carbon nanotube nanothermometer" *Applied Physics Letters*, vol. 83, No. 14, pp. 2913-2915 (2003).

Y. Gao and Y. Bando, "Carbon nanothermometer containing gallium" *Nature*, vol. 415, p. 599 (2002).

* cited by examiner

*Primary Examiner*—Diego Gutierrez
*Assistant Examiner*—Mirellys Jagan
(74) *Attorney, Agent, or Firm*—Wenderoth, Lind & Ponack, L.L.P.

(57) ABSTRACT

By preliminarily measuring the gallium temperature and the length change of a temperature sensing element comprising a carbon nanotube having a continuous column of gallium contained therein, then heating the temperature sensing element installed in a subject to increase the temperature thereof in air, removing the temperature sensing element subjecting to measure the gallium length, and substituting the measured gallium length in a formula, the temperature is measured accurately over a wide temperature range in a micrometer size or less environment.

3 Claims, 4 Drawing Sheets

TEMPERATURE MEASURING METHOD USING MICRO TEMPERATURE SENSING ELEMENT

TECHNICAL FIELD

The present invention relates to a temperature measuring method using a minute size temperature sensing element. More specifically, it relates to a novel temperature measuring method capable of measuring the temperature accurately over a wide range, using a temperature sensing element comprising a carbon nanotube containing columnar gallium.

BACKGROUND ART

After the discovery of the carbon nanotube in 1991, a number of studies have been carried out by many researchers. Various technical improvements and methods of utilization have been discovered concerning carbon nanotubes. For example, nowadays, it is utilized widely for field effect devices, probe top ends for scanning probe microscopes, superconductive materials, highly sensitive microbalances, structural materials, minute forceps for the nanoscale operation, parts for gas detectors, hydrogen energy storage devices, or the like. Moreover, studies have been executed actively for containing the various fillers in the carbon nanotube (Document 1 and Document 2).

For example, as the substances to be contained in the carbon nanotube, a metal such as lead, tin, copper, indium, mercury, an alkali metal such as lithium, sodium, potassium, rubidium, and cesium, a superconductor such as lead, tin, and gallium, a semiconductor such as silicon, germanium, gallium arsenide, zinc selenide, and zinc sulfide, a magnetic material such as samarium, gadolinium, lanthanum, iron, cobalt and nickel, and a mixture thereof have been discussed.

Moreover, an organic molecule semiconductor such as a naphthalene, anthracene, phenanthrene, pyrene, and perylene, an organic dye molecule such as a cyanine dye and a β-carotene, and furthermore, a gas molecule such as hydrogen fluoride, methane, and ethane, or the like have been discussed.

On the other hand, recently, a number of researchers have been involved in the study of the micrometer size area so that the nano thermometer capable of measuring the temperature in the micrometer size environment has been increasingly called for. However, the nano thermometers known so far have a relatively narrow measurable temperature range so that several kinds of the thermometers need to be prepared for each temperature range to be measured in the case of measuring the temperature over a wide range. Due to troublesomeness and high cost, development of a nano thermometer capable of measuring temperature over a wide range by itself has strongly been desired.

Under such circumstances, a nano thermometer utilizing a gallium, capable of accurately measuring the temperature over a relatively wide temperature range has been proposed. As the principle of the temperature measurement, the linear expansion or contraction of the gallium according to the temperature change over a wide range is utilized. By measuring the change of the length of the columnar gallium by a high resolution transmission electron microscopy, the temperature is measured.

The production method for a temperature sensing element comprising a carbon nano tube having a 1 to 10 μm length for containing the columnar gallium and a 40 to 150 nm diameter is known already (Document 3). Moreover, the production method for a temperature sensing element according to the heat treatment at 1,200 to 1,400° C. of gallium oxide powders and carbon powders under inert gas flow has been developed by the present inventors and it is already the subject of a patent application (Application 1).

However, as to the temperature measuring method, utilizing a nano thermometer utilizing a gallium column discussed above, the length of the columnar gallium as the temperature sensing element cannot be read unless the subject to be measured is introduced into the observation area of the high resolution transmission type electron microscope. On the other hand, once the temperature sensing element removed from the inside of the subject to the outside for the temperature measurement, since the length of the columnar gallium returns to the length at room temperature, an accurate temperature of the subject at the high temperature cannot be known.

Document 1: P. Ajayan et al., Nature, vol. 361, page 333, 1993

Document 2: Official gazette of the Japanese Patent Application Laid Open No. 6-227806

Document 3: Gao, Y. H. & Bando Y., Nature, 415,599 (2002)

Application 1: Patent Application No. 2002-67661

Accordingly, an object of the present invention is to solve the above-mentioned problems by providing a novel method capable of accurately measuring the temperature of a subject to be measured at a high temperature even in the case where a columnar gallium temperature sensing element as a nano thermometer utilizing a gallium is removed from the inside of the subject to have the temperature measured at room temperature.

DISCLOSURE OF INVENTION

In order to solve the above-mentioned problems, the present invention provides a method for measuring the temperature using a minute size temperature sensing element, as a temperature sensing element comprising a carbon nanotube with a continuous columnar gallium contained with one end opened and the other end closed, comprising the steps of measuring the gallium length by a transmission electron microscopy in different temperature environments, inserting the temperature sensing element into a subject to be measured in the air, and removing the temperature sensing element from the subject to be measured for measuring the gallium length by transmission electron microscopy.

Figure 1:
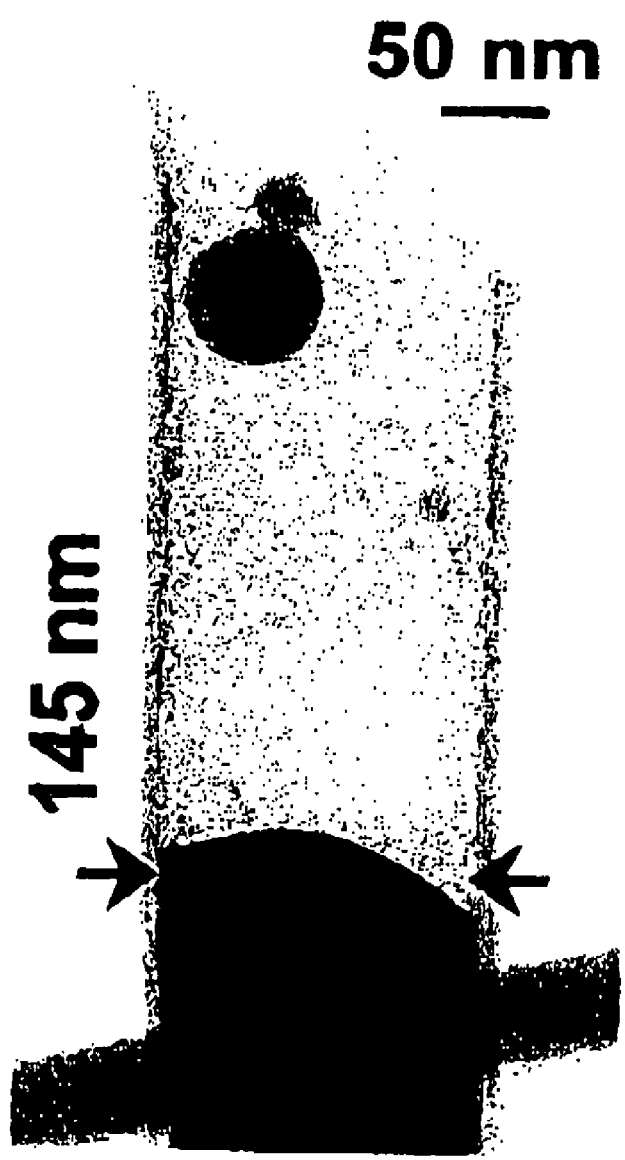
FIG. 1 is a high resolution transmission electron microscope image of a gallium-containing carbon nano tube temperature sensing element before heating, observed at 20° C.

The numeral in the figures denotes the following.
1. gallium oxide thin layer

BEST MODE FOR CARRYING OUT THE INVENTION

The present invention has the above-mentioned characteristics. The embodiments thereof will be explained hereinafter.

According to the temperature measuring method of the present invention, first, a temperature sensing element comprising a carbon nano tube with one end opened and the other end closed, containing a continuous column of gallium is introduced into the observation area of a high resolution transmission electron microscope maintained at different temperatures for measuring the length of the gallium at each temperature. Then, the temperature sensing element is inserted into a subject to have the temperature measured so as to be placed in a heated environment in the air atmosphere. According to the heating operation, the volume of the gallium is expanded as well as the top end part thereof is oxidized so as to produce gallium oxide. Since the gallium oxide is bonded with the carbon nano tube firmly so that the gallium oxide at the top end part has its position fixed even when the temperature sensing element is taken out from the subject to be measured, the temperature sensing element is taken out from the subject to have the temperature measured after cooling for measuring the length of the gallium of the temperature sensing element again using the high resolution transmission electron microscope. Thereby, the temperature of the subject can be measured.

Accordingly, the nano thermometer of the present invention utilizes the expansion characteristics of the gallium present inside the carbon nano tube according to the temperature change so that in principle it is not different from a thermometer generally used for measuring the expansion or contraction change of a mercury.

However, it differs therefrom in that the carbon nano tube has about a 1 to 10 μm length and a 40 to 150 nm diameter for the measurement of the temperature in a micrometer size environment so that it is extremely minute compared with the generally used thermometer. Therefore, in order to measure the length of the gallium in the minute carbon nano tube, use of an optical instrument such as a high resolution transmission electron microscope is necessary.

According to the present invention, as the reason for selecting gallium as the substance to be contained in the carbon nano tube, gallium has the widest liquid phase range (29.78 to 2,403° C.) among the metals so that it has the excellent characteristics of a low vapor pressure at a high temperature. Furthermore, since the volume of gallium increases linearly according to the temperature rise in a 50 to 500° C. temperature range, and furthermore, since its volume is reduced linearly in the case of lowering the temperature, it is suitable as a thermometer required to measure the temperature over a wide temperature range.

For example, compared with the liquid phase range (−38.87 to 356.58° C.) of mercury used for ordinary temperature measurement, it has a wide temperature measurement range over high temperature range, and thus the effect of using gallium for the nano thermometer is apparent.

As to the carbon nano tube containing a gallium, it can be produced according to various kinds of methods including a known method explained as the conventional technique, a method proposed by the present inventors.

With reference to the examples, embodiments will be explained in further detail.

EXAMPLES

Example 1

A temperature sensing element was produced according to the method disclosed in the above-mentioned document 3. The structure thereof was confirmed by a high resolution transmission electron microscopy with an X-ray energy diffusion spectrometer mounted. The temperature sensing element was applied onto a grid for the observation by the high resolution transmission electron microscopy. Then, the temperature sensing element was observed by the high resolution transmission electron microscopy was maintained at 20° C. and 58° C. for measuring the height of the gallium.

Figure 2:
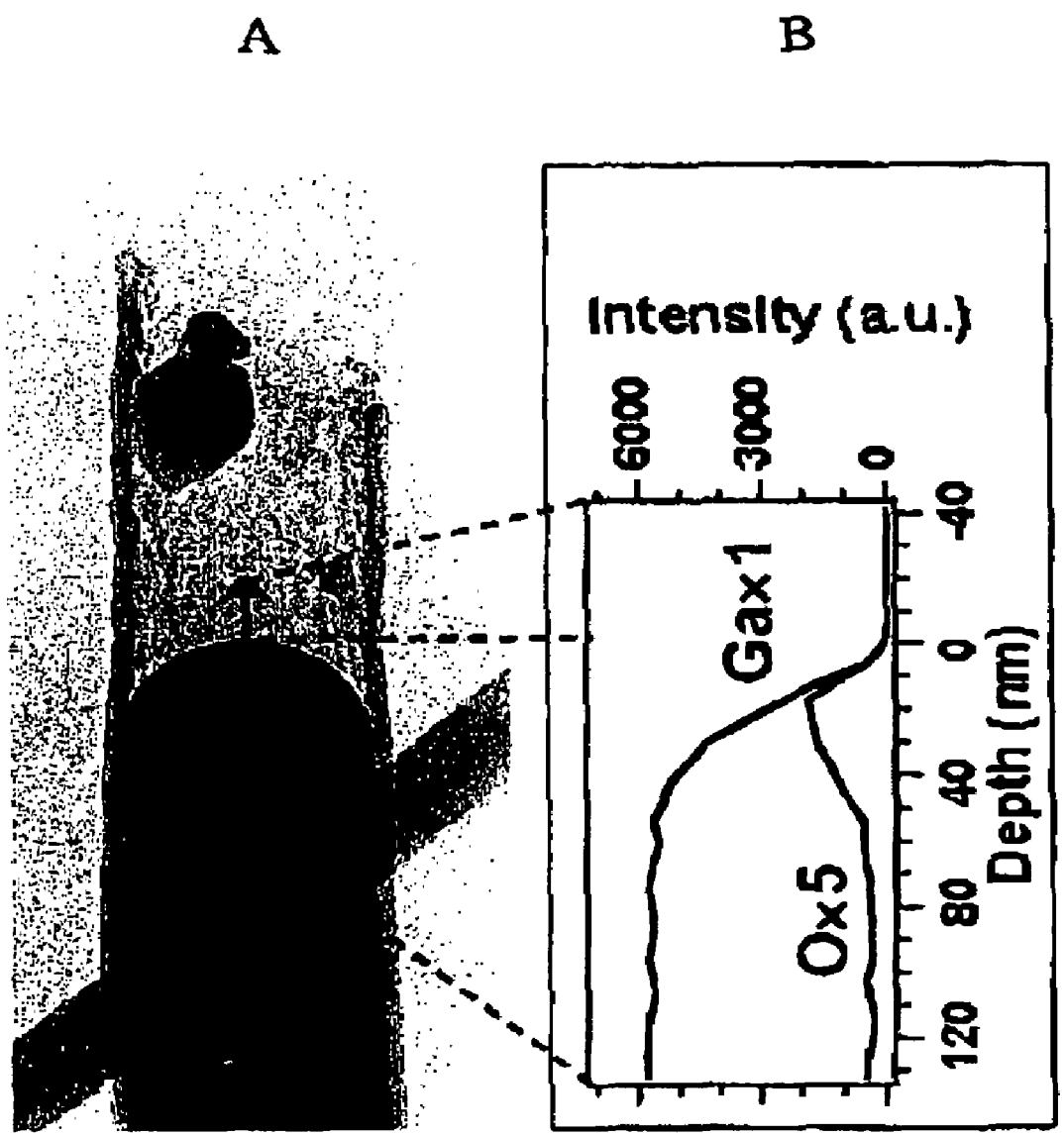
FIG. 2(A) is a high resolution transmission electron microscope image of the gallium-containing carbon nano tube temperature sensing element after heating to 358° C. in air, observed at 20° C.
FIG. 2(B) is a graph of an energy dispersive X-ray spectroscopy thereof.

FIG. 1 is a high resolution transmission electron microscope image showing the height of the gallium at the time of observing the temperature sensing element at 20° C. FIG. 2(A) is an image of the temperature sensing element observed again at 20° C. using the high resolution transmission electron microscope after introducing the same into a furnace in the air, heating at 358° C. and removal. As shown in FIG. 2(A), the top end position of the gallium is made higher than the top end position of the gallium in FIG. 1.

Accordingly, the gallium position is made higher despite the measurements at the same ordinary temperature 20° C. because the gallium top end part is reacted with oxygen so as to produce gallium oxide, and the produced gallium oxide is firmly bonded with the inner wall of the carbon nano tube so that the gallium oxide layer position at the high temperature is not lowered even after the temperature drop.

This can be confirmed also by the inclusion of oxygen at the gallium top end part as observed in the energy dispersive X-ray spectroscopy shown in FIG. 2(B).

Example 2

Figure 3:
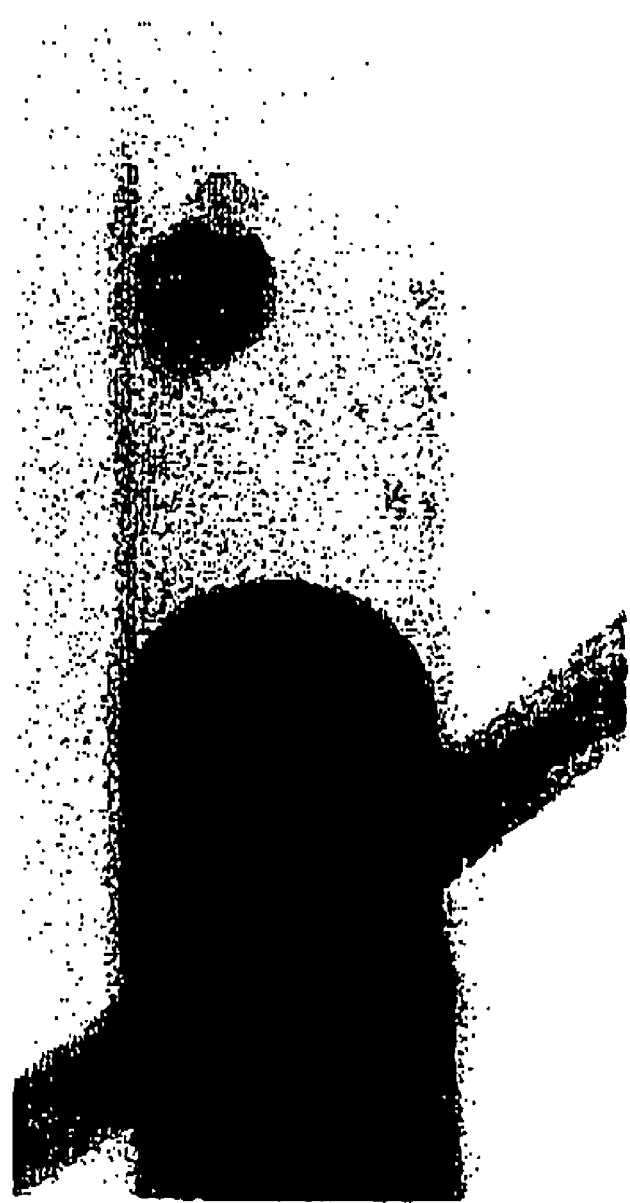
FIG. 3 is a high resolution transmission electron microscope image of the gallium-containing carbon nano tube temperature sensing element at 440° C. in air.
Figure 4:
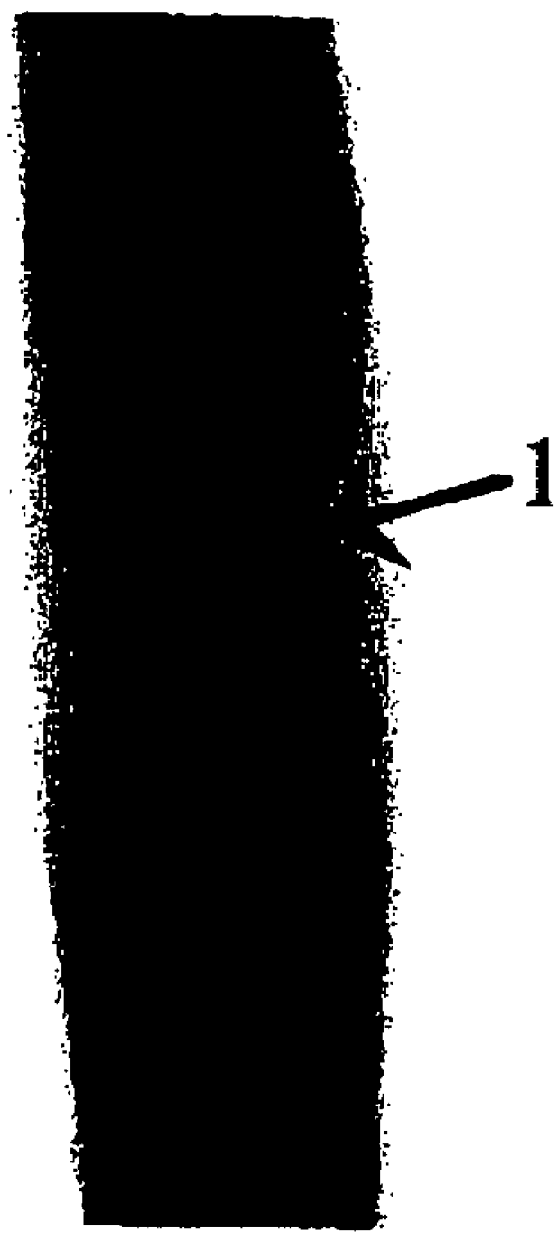
FIG. 4 is a high resolution transmission electron microscope image of the gallium-containing carbon nano tube temperature sensing element after heating to 440° C. in air, observed at 20° C.

FIG. 3 is an image of the same temperature sensing element as in Example 1 observed using the high resolution transmission electron microscope after heating to 440° C. FIG. 4 is an image thereof observed at 20° C. using the same high resolution transmission electron microscope after heating and removal.

From FIG. 4, since the gallium oxide layer is bonded firmly with the inner wall of the carbon nano tube, the gallium oxide thin layer position is not changed even after the temperature drop.

It is confirmed that gallium layer (1) of a low density layer is formed in the lower part of the gallium layer, and that the gallium oxide layer is bonded firmly with the inner wall of the carbon nano tube.

As a result of the measurement using the high resolution transmission type electron microscope accordingly, the height difference of the gallium top ends in FIG. 1 and FIG. 2(A) was 170 nm. According to the calculation using the numerical values, the gallium volume $V_0$ initially at 20° C. was $9.586 \times 10^7$ nm$^3$, the increased volume $\Delta V_1$ at the time of heating to 58° C. was $2.333 \times 10^5$ nm$^3$ ($\Delta V_1/V_0$=0.24%), and the volume increase amount $\Delta V_2$ at Th° C. was $2.577 \times 10^6$ nm$^3$. By substituting these values in the formula Th=58+$\Delta V_2/a_0 (V_0+\Delta V_1)$, (wherein $a_0$ is the expansion coefficient of the gallium at 58° C. [$0.95 \times 10^{-4}$/° C.]), Th=341° C. can be obtained as the calculation value.

Although the value is slightly lower than the real measurement value 358° C., it was confirmed that the temperature can be measured considerably accurately at a high temperature.

As to the difference in the calculation value and the real measurement value, it is considered that the gallium volume $V_0$ calculated with the premise that the carbon nano tube inner diameter is increased linearly, is larger than the real gallium volume, and that the gallium density is lowered due to oxygen diffusion, or the like.

INDUSTRIAL APPLICABILITY

According to the present invention, the temperature measurement of the micrometer size environment can be enabled, and furthermore, the temperature measurement over a wide temperature range of 50 to 500° C. can be enabled.

The invention claimed is:

1. A method for measuring the temperature of a subject using a minute size temperature sensing element, said temperature sensing element comprising a carbon nanotube with a continuous column of gallium contained therein, with one end opened and the other end closed, which comprises:
    a. inserting the temperature sensing element into a subject to be measured in an air environment,
    b. heating the subject thereby expanding the gallium in said column,
    c. oxidizing the gallium in said column in an air environment to produce a gallium oxide layer which is firmly bonded to the nanotube,
    d. cooling the subject,
    e. removing the temperature sensing element from the subject, and
    f. measuring the location of the top end of said gallium oxide layer in said nanotube as an indication of the temperature of said subject.

2. The method according to claim 1 wherein the gallium oxide top end location in the carbon nanotube is measured at different temperatures by transmission electron microscopy before measuring the temperature of said subject.

3. The method according to claim 2 wherein the gallium oxide top end location after removal from said subject is measured by transmission electron microscopy and compared with the location of said top end measured at different temperatures.

* * * * *